United States Patent Office 2,768,945
Patented Oct. 30, 1956

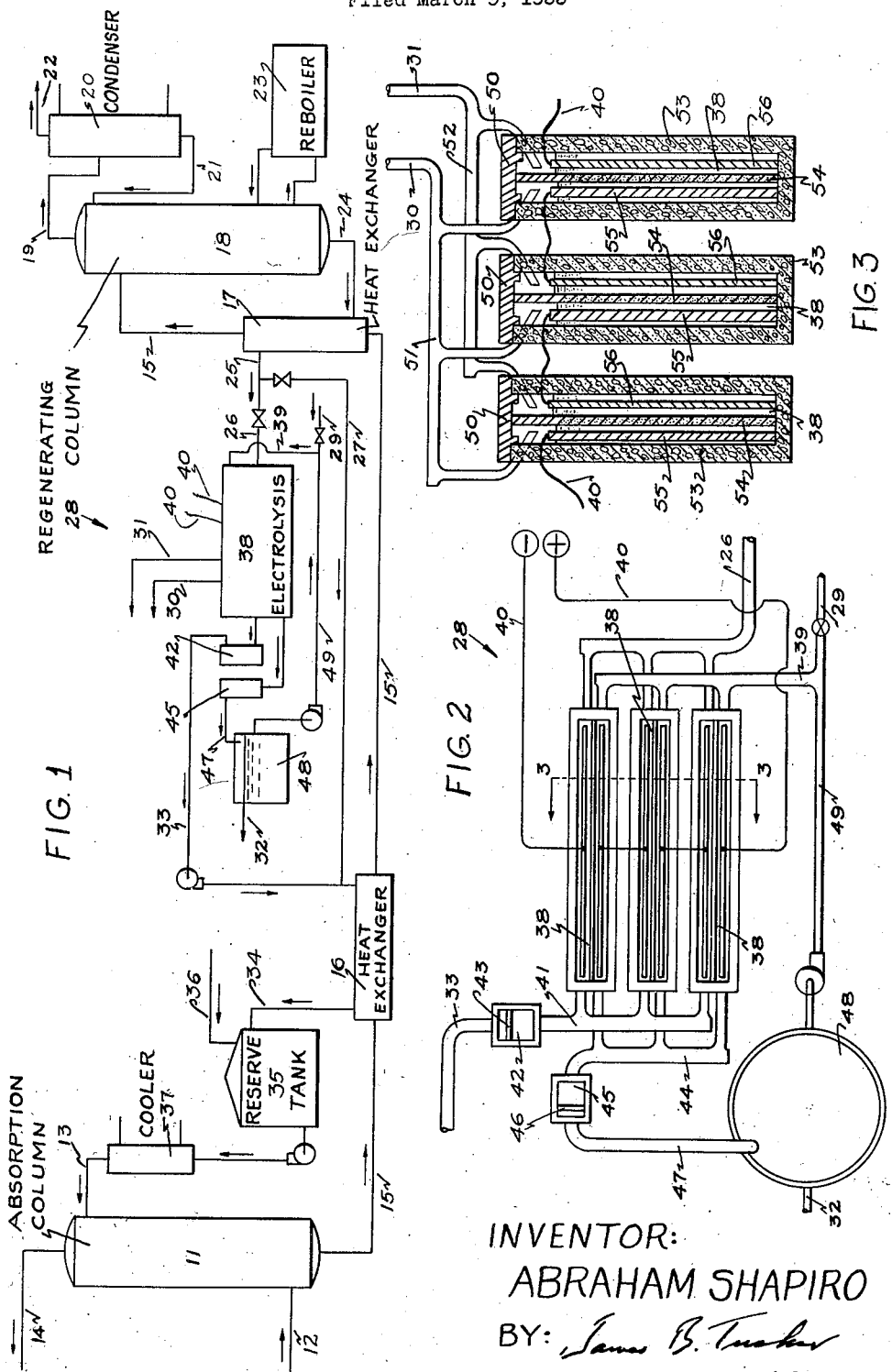

2,768,945

METHOD OF SEPARATING ACIDIC GASES FROM FLUID MIXTURES

Abraham Shapiro, Pasadena, Calif., assignor, by mesne assignments, to Socony Mobil Oil Company, Inc., a corporation of New York Application March 9, 1953, Serial No. 341,241

5 Claims. (Cl. 204—72)

This invention relates to the separation of weakly acidic, normally gaseous substances from fluid mixtures by absorption in aqueous amine solutions.

R. R. Bottoms, in U. S. Patent 1,783,901, December 2, 1930 (reissued as No. 18,958, September 26, 1933), disclosed a method of extracting acid-reacting gases such as $H_2S$, $CO_2$, and $SO_2$ from gaseous mixtures by means of any of certain amines having high boiling points, or by means of a solution of such an amine. In the Bottoms process, also known as the Girbotol process, the absorbent liquid is first brought into contact with the gaseous mixture to dissolve the acidic substance and is subsequently regenerated by heat at a temperature of about 100° C., which releases the acidic substance in gaseous form. The regenerated amine is reused to treat further quantities of the gaseous mixture in a cyclic process.

In practice, the amine chosen has nearly always been one of the ethanolamines or a mixture of them, or diaminoisopropanol, and it has been preferred to use the amine in an aqueous solution of about 10% to 30% in strength. Bottoms originally recommended an aqueous solution of triethanolamine as the preferred agent, but solutions of monoethanolamine and diethanolamine have come to be preferred because of their greater absorptive capacity. The method has also been applied to the treatment of hydrocarbon liquids such as gasoline and liquefied propane and butane, with the limitation that the amine selected must be one of those which, like diethanolamine and triethanolamine, are insoluble in hydrocarbons.

The process has been employed widely and successfully in favorable circumstances, but it has been found disappointingly expensive in cases where there is an appreciable tendency of stable amine salts to accumulate in the circulating solution. If an acid is too strong or too involatile to be driven off in the regeneration step, it remains in the solution and binds up an equivalent amount of the amine, making the latter ineffective for absorption of the weakly acidic gas. Heretofore when such an acid has accumulated in the solution, it has been necessary to replace the costly amine; this has imposed a severe economic burden.

The accumulation of strong or nonvolatile acids comes about in various ways, but principally by oxidation reactions. When HCN and $H_2S$ occur together in the amine solution, they react in the presence of an oxidizing agent to produce the thiocyanate of the amine. The thiosulfate and, to a lesser extent, the sulfate and salts of organic acids are also formed by oxidation reactions. Unfortunately, it has not been found feasible to completely exclude oxidizing agents from an amine absorption system.

It has been attempted to recover the amine from the stable compounds by mixing with lime or caustic soda and distilling off the free amine. This has not been successful except in the case of certain amines having rather low boiling points because most of the water distills off before the amine volatilizes, leaving a solution of high viscosity and high salt content, with such poor heat transfer properties that the distillation of the amine is accompanied by decomposition.

I have found that, by modifying the amine absorption process to include a partial electrolytic purification of the amine solution being returned from the regeneration step to the absorption step, and by maintaining some of the amine, not less than about one half of one percent by weight with respect to the entire solution, in combined form throughout the process, it is possible to prevent accumulation of strong and nonvolatile acids at low cost, of the order of one tenth the cost of maintaining the activity of the solution by addition of fresh amine.

The electrolytic cells employed are of the type in which a permeable partition is interposed between the anode and the cathode, and they are operated in such manner as to minimize the flow of liquid (as distinct from the flow of ions) through the partitions in either direction.

The improved process is described in the following and is illustrated by the accompanying drawings, in which.

Fig. 1 is a flow diagram illustrating the entire process;

Fig. 2 is a diagram in plan view illustrating the electrolytic purification step; and Fig. 3 is a cross-sectional view of the electrolytic cells.

Referring to Fig. 1, 11 is an absorption column provided internally with conventional means for bringing immiscible fluids into contact, such as bubble plates, ceramic packing shapes, or (if a liquid is to be treated) a series of agitation chambers. The fluid to be treated is introduced to the bottom of the column by line 12. The fluid may be a gas or a hydrocarbon liquid, but in either case it is contaminated by weakly acidic, normally gaseous or extremely volatile substances such as $H_2S$, $CO_2$, HCN, or $SO_2$.

An aqueous solution of an amine, preferably diethanolamine, is introduced to the top of column 11 by line 13, and the two materials move through the column in contact with one another and at least generally in countercurrent relation. The treated fluid, substantially free of acid-reacting substances, is removed from the top of the column by line 14. The fouled amine solution is taken from the bottom of the column by line 15 through heat exchangers 16 and 17 to regenerating column 18, where it is introduced near the top.

In the regenerating column, which is also provided with bubble plates or the like, the amine solution is brought into contact with steam rising from the bottom of the column. This raises the temperature of the solution to its boiling point, which is sufficient to decompose the unstable amine salts, and the gaseous products of the decomposition are carried off by the steam through overhead line 19 to condenser 20. In the latter, the steam is condensed into water which is returned to the top of the column by line 21. The uncondensed gas, which consists of water vapor and the weakly acidic, normally gaseous material extracted from the fluid introduced by line 12, is withdrawn from the system by line 22.

From the bottom of the column some of the solution is withdrawn and circulated through reboiler 23, which supplies the heat necessary for generating the steam which passes upwardly through the column. The regenerated amine solution, which is to be reused in absorption column 11, is taken from the bottom of column 18 by line 24.

The portion of the process described to this point is essentially the same as in the method originally disclosed by Bottoms and employed commercially in many plants. Those skilled in the art will understand that numerous details, not explicitly shown or described, are implicit in the description.

The amine solution withdrawn from the column 18 by line 24 is fairly free of weakly acid-reacting, normally gaseous or highly volatile substances such as $H_2S$, $CO_2$, and HCN. The small proportion of those substances which remains in the solution creates no problem because they do not tend to accumulate in the system. But the solution also includes stable amine salts such as the thiocyanate, the thiosulfate, and the sulfate. Since the latter salts are not decomposed in the regenerating column, they have in the past accumulated in circulating amine solutions, thus continually reducing the amount of free amine available for absorbing acidic materials from the fluid being treated.

The sulfite also may accumulate in the amine solution. It is true, as taught by Bottoms, that $SO_2$ is one of the acid-reacting gases which can be driven from an amine solution by boiling the solution, but it passes off more slowly than the less strongly acidic gases. Therefore, in a process primarily intended to separate $H_2S$, for example, from a fluid mixture and in which the regenerating column is designed and operated with a view to optimum removal of $H_2S$ from the fouled amine solution, such $SO_2$ as may be incidentally present in the fluid mixture or may be created by oxidation within the system would tend to remain in the solution and to accumulate.

In the present process, the tendency of more or less stable amine salts to accumulate in the amine solution is counteracted by subjecting the regenerated solution to an electrolytic purification which removes the acidic components of those salts at a rate equal to the rate at which the acidic components are introduced to the system and created therein.

The amine solution from line 24 is passed through heat exchanger 17, where it gives up part of its heat to the foul solution in line 15. It leaves the heat exchanger by line 25 at a temperature favorable for electrolysis, which may be in the range 100° F. to 130° F. Line 25 divides into the two branches 26 and 27, of which the former leads to the electrolytic purification equipment generally indicated at 28. This equipment is more fully illustrated in Figs. 2 and 3 and is described below.

The electrolytic system receives added water by line 29, it gives off waste gases by lines 30 and 31, and it yields an aqueous acid solution by line 32. The electrolyzed amine solution flows from the electrolytic system by line 33 and joins the remainder of the lean solution flowing in by-pass line 27; the combined stream then passes through heat exchanger 16 wherein as much of its heat as feasible is transferred to the foul solution in line 15.

Then the regenerated and partially purified amine solution passes by line 34 to reserve tank 35, which serves to stabilize the volume of solution in the system and also to effect additional cooling. The liquid level in tank 35 is maintained by intermittent or continuous addition of water by line 36 to make up for the water lost from the system by evaporation and otherwise. For this purpose it is preferable to use water which is free of sodium and similar strong cations. When such cations are present in the amine solution they form sulfides, carbonates, etc. which are not decomposed in the regenerating column but are decomposed in the electrolytic cells; they therefore impose an unnecessary load upon the electrolytic battery. A slight proportion of sodium or the like is not appreciably disadvantageous, but the metallic cations should not be permitted to accumulate in the solution. Since there is ordinarily no way for the strongly alkaline metals to enter the system except with the water added by lines 29 and 36, the use of pure water is adequate for excluding undesirable cations.

From time to time small quantities of fresh amine are added to replace the loss of amine by leakage, evaporation, and entrainment or solution in effluent fluids. But the requirements for fresh amine in this process are inconsequential as compared with the requirements in previous forms of the amine absorption process.

From tank 35 the amine solution is pumped through cooler 37 and line 13 into the top of absorption column 11, thus completing the cyclic process.

Referring now to Fig. 2, which illustrates electrolysis equipment 28, the amine solution in line 26 flows to the cathode compartments of a battery of electrolytic cells 38—38, here shown as consisting of three. A dilute acid solution is passed to the anode compartments of the same cells by line 39. The cells are supplied with direct current by electrical leads 40—40.

The electrolytic battery is shown as being arranged in parallel with respect to liquid flow and in series with respect to electric current. The choice as to arrangement of cells is principally one of convenience only; however, it is preferable not to place more than a few cells in series with respect to flow of the amine solution because it is more economic to subject a large volume of the solution to slight purification than to more completely purify a small volume.

The electrolyzed amine solution flows from the cathode compartments by way of manifold 41 to liquid-level control box 42 which is provided with weir 43 or other means for stabilizing the liquid level in the cathode compartments. The solution then enters line 33 and is handled as shown in Fig. 1 and described above.

The acid solution from the anode compartments flows through manifold 44 to box 45, provided with liquid-level control means such as weir 46. Weirs 43 and 46 are adjusted to minimize flow of uncharged molecules through the permeable partitions of the cells, in a manner which is described below.

Since the acid solution increases in specific gravity during its passage through the anode compartment of a cell, it is preferable to introduce it to the cells near the top and to withdraw it from near the bottom. The change in specific gravity of the catholyte is ordinarily negligible, therefore no similar arrangement of the inlets and outlets of the cathode compartments is provided.

The acid solution is then taken by line 47 to settling tank 48, where it is freed of suspended precipitates such as sulfur and polymerization products of thiocyanic acid. A stream of the acid solution is withdrawn from tank 48 by line 49 and, before being returned to the electrolytic battery by line 39, is joined by a small quantity of water from line 29. Flow of the latter is adjusted to maintain the specific gravity of the acid solution fed to the electrolytic cells less than the specific gravity of the catholyte but to avoid reducing the acidity of the anolyte to a level less than that equivalent to about 0.1% $H_2SO_4$.

Another stream of acid solution is taken from tank 48 by overflow, through line 32. This constitutes the liquid acid product of the operation. From time to time the solid acidic product is gathered from the bottom of tank 48.

The electrolytic cells also yield gases and vapors. Since these include toxic or otherwise noxious substances such as hydrogen cyanide, cyanogen, hydrogen sulfide, sulfur dioxide, and ammonia, it is desirable to capture them rather than to permit them to escape to the atmosphere. For this purpose, the cells are provided with covers 50—50, as shown in Fig. 3, and the spaces between the electrolyte levels and the covers are connected to manifolds 51 and 52 which lead to gas withdrawal lines 30 and 31 respectively. The gases from the anode compartments and the cathode compartments are withdrawn separately to avoid the formation of explosive mixtures of hydrogen and to avoid clogging of the lines by ammonium salts.

Electrolytic cells 38—38 are contained in narrow rectangular boxes 53—53 made, for example, of concrete covered with a bituminous composition. The cells are divided into anode and cathode compartments by permeable partitions 54—54, which may consist of thin plates of a rather coarse-grained, very permeable ceramic material having at least moderately good mechanical strength. A material having the texture and chemical composition of common fire brick is satisfactory. The upper portions of the partitions, down to a line just below the liquid levels, are made impermeable as by painting or impregnating with bituminous material. This serves to prevent mixture of the anode and cathode gases by diffusion through the partitions and to prevent seepage of liquid above the lower liquid level when the anolyte and catholyte levels are not equal.

Ions move freely through the permeable partitions, but the flow of liquid through the partitions is very slight and is limited to the passage of water from the anolyte into the catholyte by electro-osmosis, i. e., the tendency of hydrogen ions to associate themselves with water molecules and to draw the latter toward the cathode. This is accomplished by adjusting weirs 43 and 46 to maintain the anolyte and catholyte levels nearly equal, the departure from exact equality being chosen to create a hydrostatic pressure differential from the catholyte toward the anolyte which partially counteracts the pressure differential due to electro-osmosis. At no point on a partition should electro-osmosis be overbalanced, nor should it at any point be accompanied by a hydrostatic pressure differential in the same direction.

The difference in hydrostatic pressure depends on two factors, the difference in liquid levels and the difference in specific gravities. The component of the pressure differential due to the latter factor increases with the depth of liquid, while the differential due to electro-osmosis is uniform. This prevents the maintenance of an equal degree of pressure balance over an entire partition except in a case where the two solutions are equal in specific gravity. However, when the amine solution fed to a cell is heavier than the acid solution, this departure from uniformity is partially counteracted by stratification of the anolyte. Therefore it is preferable that the acid solution supplied to a cell have a specific gravity less than that of the amine solution.

It is ordinarily satisfactory to adjust the liquid levels, in view of the difference in average specific gravities of the two solutions in a cell, in such manner as to maintain a mean hydrostatic pressure differential equivalent to about .05 inch of water. When cells or groups of cells are arranged in series with respect to flow of the acid solution, the specific gravity of the anolyte varies considerably in different parts of the battery; in such cases it is therefore desirable to provide a greater number of liquid-level control means to maintain the preferred differences in liquid level in the various cells.

Electrodes 55—55 and 56—56 are flat members mounted to face all or nearly all of the submerged surfaces of parttions 54—54. Anodes 55—55 preferably consist of slabs of graphite. Cathodes 56—56 may be made of any of various conductive materials resistant to alkaline corrosion, including steel. I prefer to space the electrodes about ¾ inch from the partitions, but this distance is not critical.

I have found that, in electrolytic cells constructed essentially as described, acting upon an aqueous solution containing about 15% total free and combined diethanolamine and a varying proportion of acid radicals consisting predominantly of the thiocyanate and the thiosulfate with minor quantities of sulfate, sulfite, sulfide, lower mercaptides, cyanide, and undetermined anions, each cell being provided with an electric potential of about 7 volts, the electrolysis produces about .08 to .11 pound per hour of free diethanolamine from previously combined diethanolamine per square foot of effective cathode (or anode) area, provided the proportion of combined diethanolamine does not fall below about one half of one percent by weight with respect to the total amine solution. The average current density is about 30 amperes per square foot.

The removal of thiocyanate is surprisingly complete as compared with the degree of removal of other anions. This, together with the fact that the minute proportion of sulfide present in the amine solution actually increases during the electrolysis, suggests that in addition to the electrolytic decomposition of the amine thiocyanate a substantial portion of the thiocyanate in the cathode compartments is chemically decomposed, presumably by reduction reactions caused by the nascent hydrogen at the cathodes.

The diethanolamine solution mentioned is one employed to extract hydrogen sulfide from various gaseous and liquid products of a petroleum refinery supplied with California crude oil.

In any particular installation, the rate at which the amine tends to be combined to form salts not decomposed in the regenerating column may be observed, and accordingly an electrolytic battery having electrode area at least sufficient to decompose the stable amine salts at the same rate may be provided.

The size of the electrolytic battery being thus determined, the amount of amine solution to be taken by line 26 and subjected to electrolysis may be decided upon. The rate of flow of the solution through the cathode compartments should be low enough to avoid turbulence which would tend to disturb the electrolytic classification of acids and bases between the cathodes and the partitions. Since the difference between the acid content of the amine solution leaving the electrolytic battery and the acid content of the amine solution elsewhere in the system, for example in line 25, is inversely proportional to the quantity of solution passed through the electrolytic cells, and since it is desirable that this difference be low, the preferred rate of flow of the catholyte is not greatly less than the maximum. However, it is permissible that the rate of flow be much lower, it being required only that the amine solution not remain in the cells long enough to approach complete removal of acid components, for that would prevent the electrolytic battery from removing the acids at its calculated capacity.

The remainder, if any, of the amine solution from line 25 is taken by by-pass line 27 and reintroduced to the system downstream from the electrolytic equipment. By-pass 27 also serves to carry the entire flow of amine solution at times when the electrolytic battery is shut down for cleaning or reconditioning.

A very wide range of flow rates is permissible for the circulating anolyte. The velocity should be great enough to prevent the acid solution from increasing in concentration, during its course through the electrolytic battery, enough to materially exceed the catholyte in specific gravity, and it should be low enough to avoid turbulence within the cells.

It is possible, by the use of electrolysis, to produce a substantially pure solution of free amine and such other nonvolatile bases (e. g., NaOH) as may be present. But to do so would be uneconomic because the efficiency of the process as regards free amine produced per kilowatt-hour decreases as the proportion of combined amine decreases. The efficiency falls off so sharply when the proportion of combined amine approaches zero that I believe it will very seldom be desirable to maintain less than about one percent of combined amine in the effluent from the electrolytic battery and never desirable to maintain less than one half of one percent. The only disadvantage in maintaining a much higher proportion, such as 6% of combined amine is the expense of the investment in amine which does not function in the absorption column and serves the process only by facilitating the electrolysis.

In a particular installation and at a particular time, the optimum proportion of combined amine to be maintained in the solution may be determined in view of the observed relation between electrolytic efficiency and proportion of combined amine, the rate at which acidic components are to be removed, the total volume of amine solution in the system, the cost of electric current, the cost of amine, and the prevailing interest rate. Since all these factors are variable, no fixed rule concerning the optimum proportion of combined amine can be given. When the tendency of stable amine salts to accumulate is slight, the optimum proportion may be in the neighborhood of one percent or, in an extreme case, as little as one half of one percent. When the strong and nonvolatile acids are created and introduced more rapidly, the preferred amount of combined amine to be maintained in the solution is correspondingly greater up to about five or six percent.

The proportion of combined amine in the effluent from the electrolytic battery (and consequently the slightly higher proportion of stable amine compounds elsewhere in the system) may best be controlled from day to day by varying the voltage. If the potential required is found to regularly exceed about 7 volts in the individual cells, the capacity of the battery should be increased by the installation of additional cells.

Amines other than the ethanolamines and diaminoisopropanol have but rarely been employed in the Bottoms process and there is no reason to suppose that they will be chosen for the present process. However, all the amines which are capable of forming strong aqueous solutions and which fall within the group defined by Bottoms in the above-mentioned patent as being useful in his method, i. e., aliphatic and cycloparaffin amines having boiling points not substantially less than that of water and having no carboxyl or carbonyl groups in the molecule, are closely similar to one another as regards response to electrolysis and are therefore as suitable for use in the present process as in the original process. It should be noted that, by Bottoms' definition, the term "aliphatic amine" includes cyclic substances such as benzylamine and piperidine, in which the nitrogen is attached to or incorporated in a ring structure through the medium of one or more methylene groups.

I claim as my invention:

1. The method of separating acidic substances from a predominantly water-insoluble fluid mixture which comprises: bringing said fluid mixture into contact with an aqueous amine solution whereby said solution dissolves said acidic substances; raising the temperature of the acid-bearing amine solution to its boiling point to drive off weakly acidic, normally gaseous components; subjecting at least part of the amine solution from said heating step to electrolysis to further increase the proportion of free amine in said solution; and employing the thus reactivated solution in the treatment of further quantities of said fluid mixture.

2. The method of separating acidic substances from a predominantly water-insoluble fluid mixture which comprises: bringing said fluid mixture into contact with an aqueous amine solution whereby said solution dissolves said acidic substances; raising the temperature of the acid-bearing amine solution to its boiling point to drive off weakly acidic, normally gaseous components; subjecting at least part of the amine solution from said heating step to electrolysis to remove stronger acids and less volatile acids at a rate substantially equal to the rate at which said acids are introduced to the solution and created therein; and employing the thus reactivated solution in the treatment of further quantities of said fluid mixture.

3. The method of separating acidic substances from a predominantly water-insoluble fluid mixture which comprises: bringing said fluid mixture into contact with an aqueous amine solution whereby said solution dissolves said acidic substances; raising the temperature of the acid-bearing amine solution to its boiling point to drive off weakly acidic, normally gaseous components; subjecting at least part of the amine solution from said heating step to electrolysis to further increase the proportion of free amine in said solution; employing the thus reactivated solution in the treatment of further quantities of said fluid mixture; and maintaining in said solution throughout said method a portion of the amine, from about one half of one percent to about six percent by weight with respect to the solution, in the form of heat-stable amine salts.

4. The method of separating acidic substances from a predominantly water-insoluble fluid mixture which comprises: bringing said fluid mixture into contact with an aqueous amine solution whereby said solution dissolves said acidic substances; raising the temperature of the acid-bearing amine solution to its boiling point to drive off weakly acidic, normally gaseous components; passing at least part of the amine solution from said heating step through the cathode compartments of a battery of electrolytic cells having permeable partitions between electrodes; passing an aqueous acid solution through the anode compartments of said cells; and employing the thus reactivated amine solution in the treatment of further quantities of said fluid mixture.

5. The method of separating acidic substances from a predominantly water-insoluble fluid mixture which comprises: bringing said fluid mixture into contact with an aqueous amine solution whereby said solution dissolves said acidic substances; raising the temperature of the acid-bearing amine solution to its boiling point to drive off weakly acidic, normally gaseous components; passing at least part of the amine solution from said heating step through the cathode compartments of a battery of electrolytic cells having permeable partitions between electrodes; passing an aqueous acid solution through the anode compartments of said cells; controlling the specific gravity of said acid solution and the liquid levels in said cells to minimize flow of uncharged molecules through said permeable partitions; and employing the thus reactivated amine solution in the treatment of further quantities of said fluid mixture.

References Cited in the file of this patent

UNITED STATES PATENTS

| | | |
|---|---|---|
| Re. 18,958 | Bottoms | Sept. 26, 1933 |
| 2,363,386 | Bock | Nov. 21, 1944 |
| 2,363,387 | Bock | Nov. 21, 1944 |